(12) United States Patent  
Hampel

(10) Patent No.: US 8,817,797 B2
(45) Date of Patent: Aug. 26, 2014

(54) METHOD AND APPARATUS FOR MULTIPATH PROTOCOL PACKET RELAY

(75) Inventor: Karl Georg Hampel, New York, NY (US)

(73) Assignee: Alcatel Lucent, Boulogne-Billancourt (FR)

( * ) Notice: Subject to any disclaimer, the term of this patent is extended or adjusted under 35 U.S.C. 154(b) by 130 days.

(21) Appl. No.: 13/363,329

(22) Filed: Jan. 31, 2012

(65) Prior Publication Data

US 2013/0195004 A1    Aug. 1, 2013

(51) Int. Cl.
*H04L 12/28* (2006.01)

(52) U.S. Cl.
USPC ........... 370/400; 370/230; 370/235; 370/469; 709/227; 709/228

(58) Field of Classification Search
None
See application file for complete search history.

(56) References Cited

U.S. PATENT DOCUMENTS

| 8,458,353 | B2 | 6/2013 | Krishnaswamy et al. | |
|---|---|---|---|---|
| 2011/0296006 | A1* | 12/2011 | Krishnaswamy et al. | 709/224 |
| 2012/0020284 | A1* | 1/2012 | Haddad | 370/328 |
| 2012/0093150 | A1* | 4/2012 | Kini | 370/389 |
| 2012/0099601 | A1* | 4/2012 | Haddad et al. | 370/401 |
| 2012/0188949 | A1* | 7/2012 | Salkintzis et al. | 370/329 |
| 2012/0331160 | A1* | 12/2012 | Tremblay et al. | 709/228 |
| 2013/0064198 | A1* | 3/2013 | Krishnaswamy et al. | 370/329 |
| 2013/0086142 | A1* | 4/2013 | Hampel et al. | 709/203 |
| 2013/0194963 | A1* | 8/2013 | Hampel | 370/254 |
| 2013/0195004 | A1 | 8/2013 | Hampel | |
| 2013/0195106 | A1* | 8/2013 | Calmon et al. | 370/389 |

OTHER PUBLICATIONS

U.S. Appl. No. 13/189,914, filed Jul. 25, 2011, 28 pages.

* cited by examiner

*Primary Examiner* — Donald Mills
(74) *Attorney, Agent, or Firm* — Wall & Tong, LLP

(57) ABSTRACT

A method and apparatus for processing packet streams associated with stream-based transport connection to thereby enable communication between a source host and one or more destination hosts.

24 Claims, 9 Drawing Sheets

METHOD AND APPARATUS FOR MULTIPATH PROTOCOL PACKET RELAY

FIELD OF THE INVENTION

The invention relates generally to communication networks and, more specifically but not exclusively, to multipath protocol relay function.

BACKGROUND

The vast majority of Internet traffic uses stream-based transport protocols such as Transmission Control Protocol (TCP) or Stream Control Transmission Protocol (SCTP). Due to the growing number of end hosts such as smartphones and tablets, which are multi-horned, a variety of protocols have been proposed to improve end-to-end throughput or to enhance connection resilience. Examples for such protocols are Multipath TCP (MPTCP), Multi-connection TCP (MCTCP) and Concurrent Multipath Transfer SCTP (CMT SCTP).

Currently, multipath protocols can only be used if they are supported by both endpoints or hosts associated with the connection. This restriction obstructs deployment of multipath protocols since there is little incentive to upgrade an existing host unless all its potential peers are upgraded as well.

Solutions on layer 3 (L3) consist of Home Agent (HA) in Mobile IP, Packet-Data Node Gateway (PDN-GW) in LTE, GPRS Gateway Support Node (GGSN) in Universal Mobile Telecommunications System (UMTS). These functions apply tunneling mechanisms to switch between multiple paths. However, while these mechanisms permit rather inexpensive processing, they are not compliant with various middlebox requirements since the tunnel does not use stream-based protocols. These solutions further do not support multipath operation.

Solutions on layers 5-7 (L5-7) consist of Session Initiation Protocol (SIP) B2B proxies. However, such proxies do not permit seamless handover or multipath operation. They further restrict usage to applications that are specifically designed and developed for SIP.

Solutions on layer 4 (L4) consist of brute force resource and memory intensive packet relay techniques in which multiple traffic subflows are assembled into a single traffic flow for use by a single path protocol, while single traffic flows are segmented into multiple traffic subflows for use by a multipath protocol. This process requires large amounts of buffer space and processing power to perform the assembly and segmentation functions, as well as store resulting traffic segments until such time as the safe delivery of the many packets forming the various traffic segments is acknowledged by the destination endpoint such that the packets may be discarded from the buffers. As such, network-hosted relay solutions have been found to be uneconomical.

SUMMARY

Various deficiencies in the prior art are addressed by embodiments for processing packet streams associated with stream-based transport connection to thereby enable communication between a source host and one or more destination hosts.

One embodiment is adapted for use in a network element including a memory and adapted to relay data packets between two transport protocols, wherein at least one of the transport protocols supports multiple subflows, the method comprising for each received packet including a payload, mapping packet sequence information to a corresponding payload destination flow or subflow, and forwarding a packet including the packet payload and mapped sequence information toward a port associated with the payload destination flow or subflow; and for each received packet including acknowledgment information, mapping the acknowledgment information to an acknowledgment destination flow or subflow, and forwarding a packet including the mapped acknowledgment information toward a port associated with the acknowledgment destination flow or subflow.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
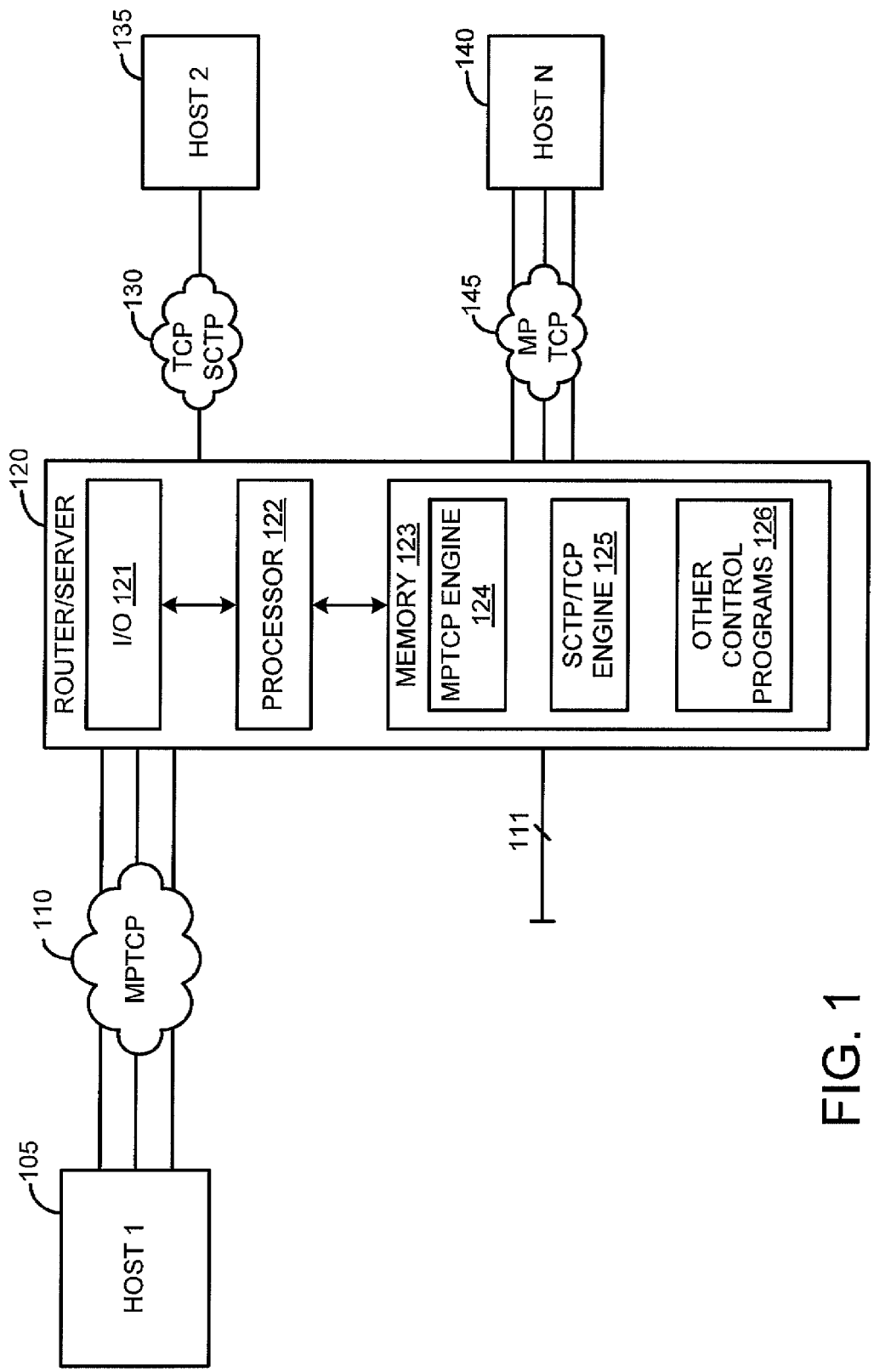
FIG. 1 depicts a high-level block diagram of an apparatus including an exemplary router and relay function benefiting from an embodiment.

Generally speaking, various embodiments discussed herein provide a relay function that may be economically implemented at a node within a network such that packet payload and acknowledgment information is relayed between multipath and conventional transport protocols, different types of multipath transport protocols, different types of conventional transport protocols or any combination thereof. Thus, while primarily described within the context of a relay function facilitating traffic flows between and multipath transport protocol and a conventional transfer protocol, it will be appreciated by those skilled in the art that the invention is applicable to various transport protocol combination, such as facilitating traffic flows between two different multipath transport protocols.

The various embodiments contemplate methods, systems, apparatus and the like that provides a relay function operable to relay packets between two transport protocols, wherein one or both of the transport protocols supports multiple subflows, wherein each subflow has its own contiguous sequence number space for each flow direction.

The relay functions support signaling to setup or teardown flows or subflows for transport protocol(s). When a packet with a payload (e.g., data) arrives at the relay, the relay determines the flow or subflow towards which the payload should be transmitted, and maps the SEQ number of the packet to an appropriate SEQ number for that flow or subflow. Similarly, when a packet with acknowledgment information (e.g., ACK, MACK, etc.) arrives at the relay, the relay determines the flow or subflow towards which the acknowledgment information should be transmitted, and maps ACK number of the packet to an ACK number of that flow or subflow. In this manner, since payload packets and ACK packets are updated and transmitted individually in a packet by packet manner, there is no need for stream assembly functions.

Various embodiments map payload data and acknowledgment information on a substantially packet by packet basis between connections having different protocols or protocol configurations. Data and/or subflow sequence information is used to update relay function data structures, illustratively mapping tables, such that packet retransmission due to protocol ACK/NACK processing may be implemented via the traffic source or host rather than network node implementing the relay function.

One embodiment is a method to relay data packets between a stream-based multipath protocol like MPTCP, MCTCP or CMT SCTP and a conventional stream-based protocol like TCP or SCTP. This method can be used for network-side relay nodes to support end-to-end split connections where one host supports a multipath protocol while the other host doesn't.

Various embodiments are directed toward a method that permits sequential packet-by-packet processing without the need for packet buffering. The SEQ- and ACK-numbers of the arriving packet on one section of the connection are evaluated and remapped to appropriate values for the other section of the connection. Parts or the packet header are then modified and the modified packet is transmitted again. In addition, the relay function sends additional signaling messages to fully support multipath operation.

The method utilizes buffer space and processing resources economically because the method avoids the need for data stream assembly and data stream re-segmentation.

There is variety of transport protocols that enable stream-based data transfer along a multitude of coexisting paths between two end hosts. Examples are Multipath TCP (MPTCP), Multi-connection TCP (MCTCP) and Concurrent Multipath Transfer SCTP (CMT SCTP). Such protocols generally are referred to herein as "multipath protocols".

Multipath protocols are mostly tailored toward environments, where at least one of the hosts is multi-homed, i.e., the multi-homed host supports multiple interfaces to different networks. In this case, one end-to-end path can be created for each interface. As long as the interface capacities are the throughput limiting factor, multipath operation can increase capacity to the sum of the link capacity. The support of multiple concurrent paths per connection also increases the resilience in case one of the interfaces breaks down. Also, multipath protocols can be used to support seamless mobility from one network to another.

Multipath protocol supports signaling that permits establishment and teardown of new subflows during the lifetime of the connection. Thus, various embodiments of the relay function also support this signaling protocol with the multipath host.

Finally, multipath protocols can support break-before-make mobility since the notion of end-to-end connectivity can prevail while an interface changes its network attachment point.

The use of multipath protocols has obtained a lot of attention with the introduction of smart phones and tablets. These devices are typically multi-homed, i.e. they permit simultaneous network access via licensed and unlicensed spectrum. Further, the wireless air interfaces are frequently the throughput bottlenecks so that considerable throughput improvement can be expected from multipath operation.

FIG. 1 depicts a high-level block diagram of an apparatus including an exemplary router and relay function benefiting from an embodiment. As depicted in FIG. 1, system 100 includes multi-homed host 105, stream-based multipath protocol network 110, an exemplary router/server 120, a stream-based conventional transport protocol network 130, conventional transport host 135 and multi-homed host 140.

Multi-homed hosts 105 and 140 include smartphones, tablets and the like. Stream-based multipath protocol networks 110 and 145 include Multipath TCP (MPTCP), Multi-connection TCP (MCTCP) and Concurrent Multipath Transfer SCTP (CMT SCTP). Conventional stream-based transport protocol network 130 include Transmission Control protocol (TCP) and Stream Control Transmission Protocol (SCTP).

The exemplary router 120 may support one or more of a relay function, and other functions within a wired or wireless network environment. Exemplary router 110 is representative of one or more of a plurality of routing/switching elements within a communication system including a plurality of routing/switching elements of various types.

The exemplary router 120 includes a network interface 111 via which the exemplary router may communicate with other devices, which may include peer and non-peer devices. Although depicted as having a single network interface 111, it will be appreciated that exemplary router 120 may include any suitable number of network interfaces.

Generally speaking, the router 120 receives input traffic data from various input ports (not shown) from one or more prior network elements. The router 120 utilizes a switch fabric to route the input traffic data toward various output ports (not shown) for transmission toward next network elements Generally speaking, the exemplary router 120 is configured for supporting communication between host 105 and host 135 and 140 via networks 110, 130 and 145 to adapt the operation of the switch fabric and/or the elements associated with the switch fabric.

As depicted in FIG. 1, exemplary router 120 includes I/O circuitry 121, a processor 122, and a memory 123. Processor 122 is adapted to cooperate with memory 123, I/O circuitry 121 to provide various relay functions for the hosts.

I/O circuitry 121 is adapted to facilitate communications with peripheral devices both internal and external to processor 122. For example, I/O circuitry 121 is adapted to interface with memory 123. Similarly, I/O circuitry 121 is adapted to facilitate communications with MPTCP Engine 124, SCTP/TCP Engine 125 and the like. In various embodiments, a connection is provided between processor ports and any peripheral devices used to communicate with a host.

Although primarily depicted and described with respect to MPTCP Engine 124, SCTP/TCP Engine 1255, it will be appreciated that I/O circuitry 121 may be adapted to support communications with any other devices suitable for providing the computing services associated with the relay content herein described.

Memory 113, generally speaking, stores data and software programs that are adapted for use in providing various computing functions within the communication system. The memory includes MPTCP Engine 124, SCTP/TCP Engine 125 and Other Control Programs 126.

In one embodiment, MPTCP Engine 124 and SCTP/TCP Engine 125 are implemented using software instructions which may be executed by processor (e.g., controller 122) for performing the various functionalities depicted and described herein.

Although depicted and described with respect to an embodiment in which each of the engines is stored within memory 123, it will be appreciated by those skilled in the art that the engines may be stored in one or more other storage devices internal to router 120 and/or external to router 120. The engines may be distributed across any suitable numbers and/or types of storage devices internal and/or external to router 120. Memory 123, including each of the engines and tools of memory 123, is described in additional detail herein below.

As described herein, memory 123 includes MPTCP Engine 124 and SCTP/TCP Engine 125, which cooperate to provide the various relay functions depicted and described herein. Although primarily depicted and described herein with respect to specific functions being performed by and/or using specific ones of the engines of memory 123, it will be appreciated that any of the relay functions depicted and described herein may be performed by and/or using any one or more of the engines of memory 123.

In various embodiments, MPTCP Engine 124 processes packet stream that arrive at the relay's MPTCP receiver. Multipath protocols are mostly tailored toward environments, where at least one of the hosts is multi-homed, i.e., the host supports multiple interfaces to different networks. In this embodiment, one end-to-end path can be created for each interface. As long as the interface capacities are the throughput limiting factor, multipath operation can increase capacity to the sum of the link capacity. The support of multiple concurrent paths per connection also increases the resilience in case one of the interfaces breaks down.

In another embodiment, multipath protocols are used to support seamless mobility from one network to another. In yet another embodiment, multipath protocols support break-before-make mobility since the notion of end-to-end connectivity can be prevailed while an interface changes its network attachment point.

In various embodiments, SCTP/TCP Engine 125 processes the stream of packets that arrive at the relay's TCP receiver. The relay function determines that a received packet pertains to the TCP section of a particular connection based on, illustratively, the IP addresses and port numbers carried on the packet header. SCTP/TCP Engine 125 splits the packet's content into information corresponding to a respective flow direction. Namely; payload and SEQ numbers are associated with one flow direction while acknowledgment information such as ACK/NACK numbers are associated with the opposite flow direction.

Payload and corresponding flow or subflow sequence numbers received from a source endpoint associated with a first or input connection are mapped to a flow or subflow associated with a second or output connection for transmission toward a destination endpoint.

Acknowledgment information received from a destination endpoint associated with the second or output connection is mapped to a flow or subflow associated with the first or input connection for transmission toward the source endpoint.

Figure 2:
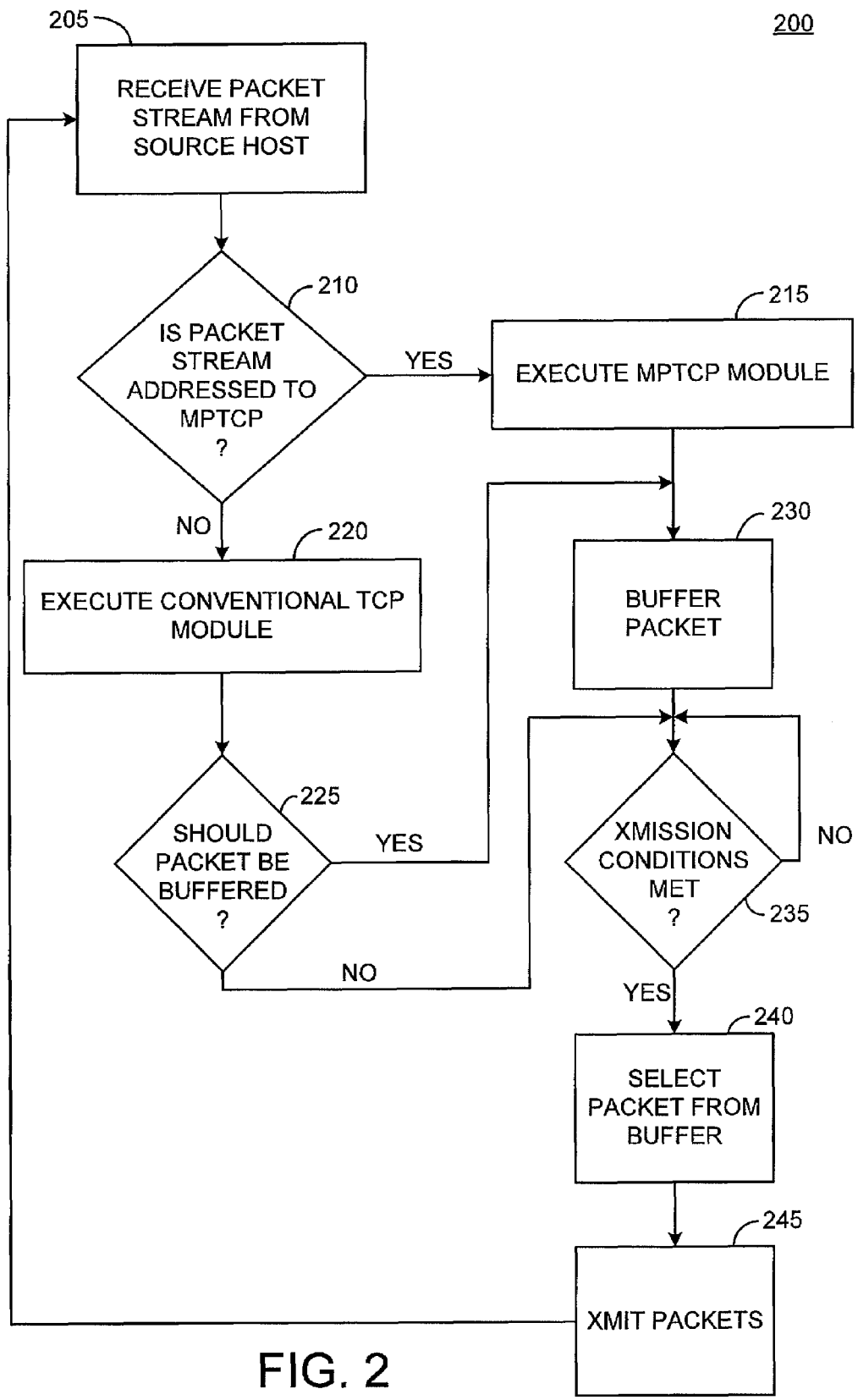
FIG. 2 depicts a flow diagram of a method for processing an incoming packet according to an embodiment.

FIG. 2 depicts a flow diagram of a method for processing an incoming packet according to an embodiment. It is noted that the graphical representation 200 of FIG. 2 is primarily a functional representation of various elements useful in understanding the present embodiments. The various functional elements depicted herein with respect to FIG. 2 may be combined with other functional elements as will be apparent to those skilled in the art and informed by the teachings of the present invention. Moreover, various functional elements depicted herein with respect to FIG. 2 may also be divided and/or distributed among other functional elements within the context of, illustratively, a router or router control mechanism such as described above with respect to FIG. 1 and/or the various other figures.

Another embodiment is directed toward a method that provides sequential packet-by-packet processing without the need for packet buffering. The SEQ- and ACK-numbers of the arriving packet on one section of the connection are evaluated and remapped to appropriate values for the other section of the connection. Parts of the packet header are then modified and the modified packet is transmitted again. In addition, the relay sends additional signaling messages to fully support multipath operation.

At step 205, a packet is received from a source host, e.g., host 105, 135, 140. At step 210 the destination of the packet is determined. If the packet's destination is MPTCP then step 215 is executed. If the packet's destination is TCP then step 220 is executed.

At step 215, MPTCP module is executed by a MPTCP engine or module. An exemplary MPTCP module is described in more detail below with respect to FIG. 3.

At step 220, Conventional TCP module is executed by SCTP/TCP engine. Conventional TCP module is further described in detail in reference to FIG. 3.

At optional step 225, a determination is made whether or not the packet should be buffered. If there is no need to back to the buffer, then the method proceeds to step 235.

At step 230, the packet is buffered. This optional buffering may be provided in various embodiments to conform to various transport protocol buffering requirements. For example, some stream-based transport protocols require buffer space to be held at either end point of each connection and to accommodate both flow directions. The sender uses this buffer to hold data which could not yet be sent or which have been sent but not acknowledged. The receiver uses such buffer to hold data which have arrived out of order, or which are already in order, but could not yet be delivered to the superseding application. The receiver further sends information on its available buffer space to the sender so that the sender cannot send more data than the receiver is able to hold.

In one embodiment, the buffer space is fixed. To mitigate large delay variations across multiple subflows, various embodiments provide flexible buffer space for the multipath receiver. In one embodiment, the buffer space is dynamically changed based on resource availability, e.g., number of subflows supported, delay-variations across paths, and the like. In this embodiment, when a packet arrives it is appropriately processed and entered into the buffer. Subsequently, a packet is selected from the buffer and transmitted when appropriate. For example, when the buffer reaches capacity is considered an appropriate time. In other embodiments, the time spent by the oldest packet in the buffer is an appropriate time. Although depicted and described with respect to an embodiment in which the appropriate time is described above, it will be appreciated by those skilled in the art that the appropriate "time construct" comprises other scenarios and time that a specific application may require.

In another embodiment, the buffer is arranged like a priority queue to guarantee fast processing. In one embodiment, the priority is based on SEQ numbers, selecting the packet with the smallest SEQ number, for instance, reestablishes the SEQ order across all packets in the buffer. At step 235, a determination is made whether or not transmission conditions are met. If no, the step is repeated. If yes, step 240 is executed. At step 240, a packet is selected from the buffer to be transmitted. At step 245, the packet is transmitted.

Figure 3:
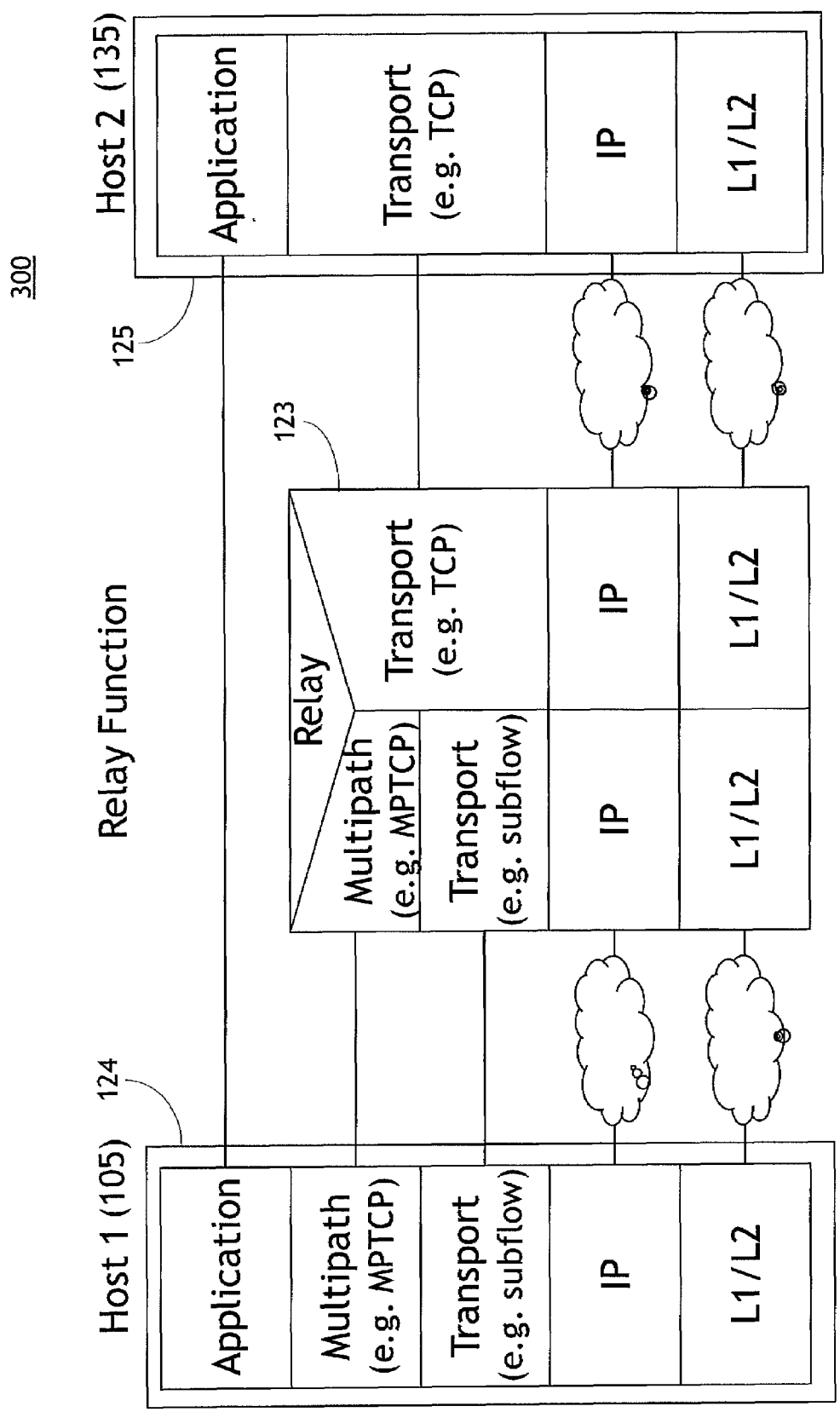
FIG. 3 depicts a graphical representation of protocol stacks for end-to-end split connection with relay function according to an embodiment.

FIG. 3 depicts a graphical representation of protocol stacks for end-to-end split connection with relay function according to an embodiment. Relay functions have been proposed for a variety of protocol layers and protocols. Solutions on L3 are Home Agent (HA) in Mobile IP, Packet-Data Node Gateway (PDN-GW) in LTE, GPRS Gateway Support Node (GGSN) in UMTS. These functions apply tunneling mechanisms to switch between multiple paths. While these mechanisms permit rather inexpensive processing, they are not compliant with middlebox requirements since the tunnel does not use stream-based protocols. These solutions further do not support multipath operation.

Solutions on layer 5-7(L5-7) are SIP B2B proxies. Such proxies do not permit seamless handover or multipath operation. They further restrict usage to applications that are specifically designed and developed for SIP. There is currently no commercially available solution for multipath protocols operating on L4. While the need for such a relay function has been recognized, a straightforward realization becomes very resource-intense. This is due to the fact that there is no obvious method to relay individual packets between the two sections of the connection without assembling the incoming data stream and re-segmenting it for consecutive transmission. Assembly and re-segmentation require large amounts of buffer space and processing power which make a network-hosted relay solution uneconomical.

In one embodiment, data packets are relayed between a stream-based multipath protocol like MPTCP, MCTCP or CMT SCTP and a conventional stream-based protocol like TCP or SCTP.

In another embodiment, data packets are relayed between two stream-based multipath protocols like MPTCP, MCTCP or CMT SCTP. This embodiment is further detailed in reference to FIG. 5.

Multipath protocols are typically built on top of conventional stream-based transport protocols such TCP and SCTP. These conventional protocols apply sequence number schemes to guarantee reliable in-order delivery of data. In TCP, the numbering is applied to octets and referred to "TCP sequence number". In SCTP, the numbering is applied to data chunks and referred to as "SCTP transport sequence number". The receiving host sends acknowledgement packets, which holds acknowledgement (ACK) numbers to acknowledge reception of a corresponding sequence (SEQ) number. From this, the sending host can infer which data have arrived and which have gone lost. Accordingly, the sending host can retransmit data that have gone lost. The terms SEQ- and ACK-numbers are used for the remainder of this document to refer to any stream-based transport protocol. Since data can be sent in both flow directions on each transport connection, an independent sequence number space has to be introduced for each flow direction.

Most end-to-end connections pass through middle boxes that typically reside in access network and have performance and/or security functions. Examples of such middle boxes are intrusion detection systems, firewalls, network address translators, performance enhancing proxies. Many of these middle boxes verify the proper use of signaling messages during connection setup and they analyze self-consistency of SEQ- and ACK numbers used by the traffic stream. They tend to block a connection in case SEQ numbers of adjacent packets contain large gaps or the ACK numbers flowing in one direction do not match the SEQ numbers of packets passing in the reverse direction.

To make multipath operation compliant with such middle boxes, each path has to look like a separate transport connection, i.e., it has to sustain proper signaling for connection setup and it has to support a separate sequence number space for each flow direction. To accomplish this scheme, the multipath protocol has to operate on top of the conventional transport protocol. This allows it to create a new transport connection for each path, referred to as "subflow" in MPTCP for instance. Since data segments running along each path must use adjacent SEQ-numbers, the multipath connection level, residing on top of the subflow level, requires an additional superseding sequence number space to assemble data segments arriving from multiple subflows. Hereinafter, these sequence numbers are referred to as "Data SEQ numbers" as opposed to "Subflow SEQ numbers."

While MPTCP and MCTCP introduce such a two-layered scheme for multipath operation, CMT SCTP currently uses one SEQ number scheme for all paths. The reason is that SCTP is not widely deployed and middleboxes usually block SCTP all together. In case SCTP should be deployed on a larger scale and tolerated by middleboxes, CMT SCTP will most likely apply the two-layer approach as currently supported by MPTCP and MCTCP. Stream-based multipath protocols are peculiar because the delay and throughput characteristics of each path are very different. For that reason, the receive buffer for a stream-based multipath protocol has to be sized much larger than for a single-path protocol to account for the different throughput and delay characteristics of the multiple paths.

Multipath operation can only be supported if both end hosts of the transport connection supports the multipath protocol. This means that upgrading a multi-host, e.g. such as a smart phone, to support multipath operation has no value as long as the remote end hosts are not upgraded as well. This restriction represents a significant burden to the deployment of the aforementioned multipath protocols.

Such a restriction can be overcome through the deployment of a relay function in the network, which relays between a multipath protocol and a conventional transport protocol.

As previously noted, new transport connections or subflows for path may be created (as well as torn down) within the context of a multipath protocol. Specifically, the various multipath protocols support signaling that permits the establishment and teardown of subflows during the lifetime of a connection. In various embodiments, this signaling is used to correspondingly initiate and/or terminate relay functionality with respect to such subflows. Therefore, the various embodiments provide additional relay functionality within the context of multipath post subflow establishment and/or teardown signaling.

In particular, the various figures provided herein are adapted to generate appropriate transport connections or packet processing functions in response to establishment of a new subflow, and/or terminate packet processing functions or transport connections in response to the tear down of a subflow. For example, in response to a determination that a first host has initiated a new sub flow within a multipath connection, various embodiments responsibly include packets from the with a second host, various embodiments responsibly establish.

Figure 4:
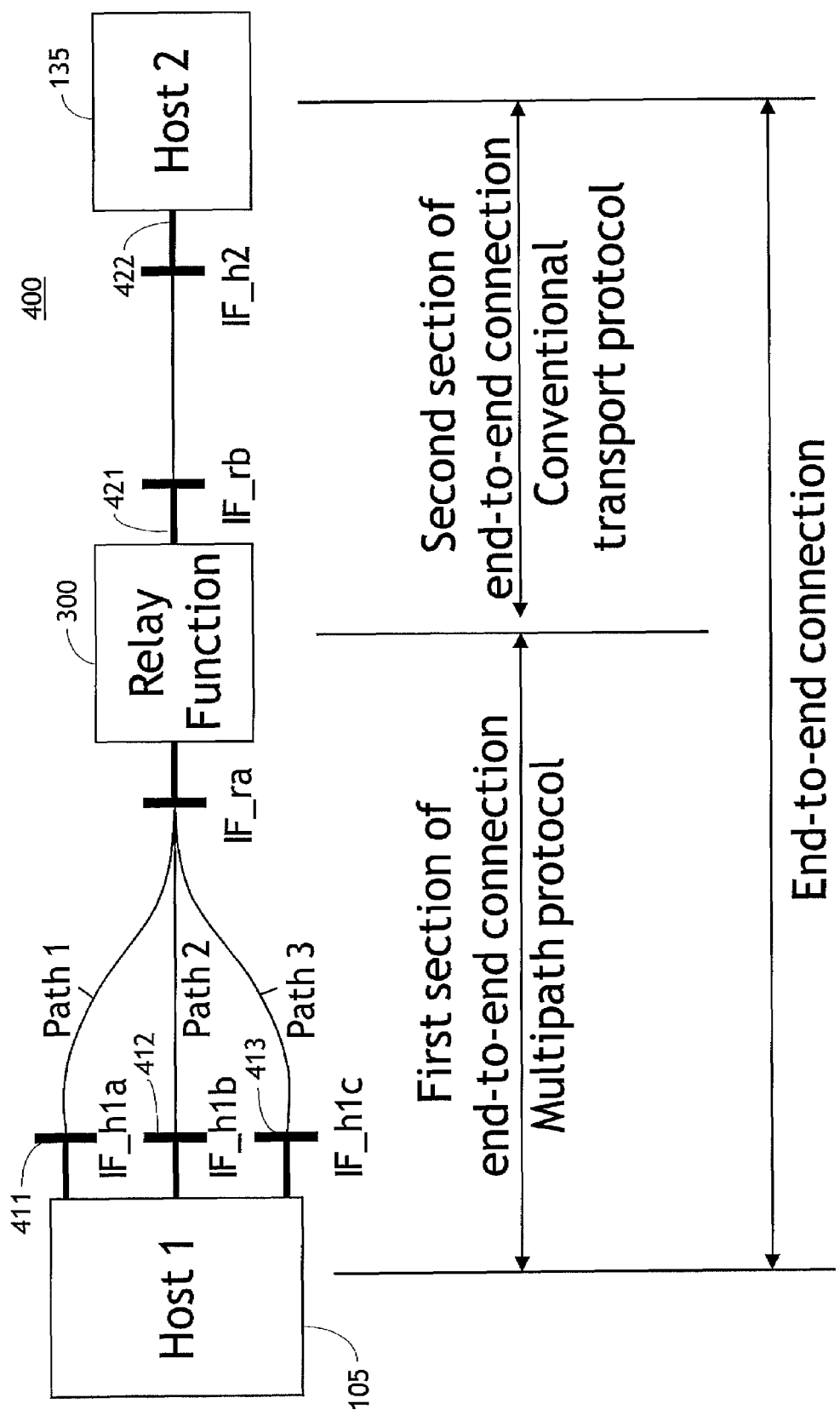
FIG. 4 depicts a graphical representation of end-to-end split connection with relay function supporting a multipath section and a conventional transport protocol according to an embodiment.

FIG. 4 depicts a graphical representation of end-to-end split connection with relay function supporting a multipath. In this embodiment, the end-to-end connections are divided into a multipath section and a conventional (i.e. single path)

section. The multipath section comprises three interfaces 411, 412 and 413. Each interface provides access to a specific network, e.g., 2.5G/3G/4G, WLAN, WiFi and the like. In one embodiment, multipath signaling information is carried in the packet header. In another embodiment, multipath signaling information is carried in the packet payload. In another embodiment, multipath signaling information is carried in-band with payload data. Payload data can be classified in a sequence of octets (as done by TCP) or in a sequence of chunks (as done by SCTP) or in other forms. In yet another embodiment, multipath signaling information is carried out of band on a separate signaling connection.

The relay function 300 relays packets between the MPTCP or MCTCP paths to a TCP connection at interface 421. As shown, host 135 is a conventional host that does not support MCTCP or MCTCP.

In another embodiment, relay function 300 relays packets between a CMT-SCTP connection and an SCTP connection. In another embodiment, the conventional transport protocol can be any stream-based transport protocol.

Figure 5:
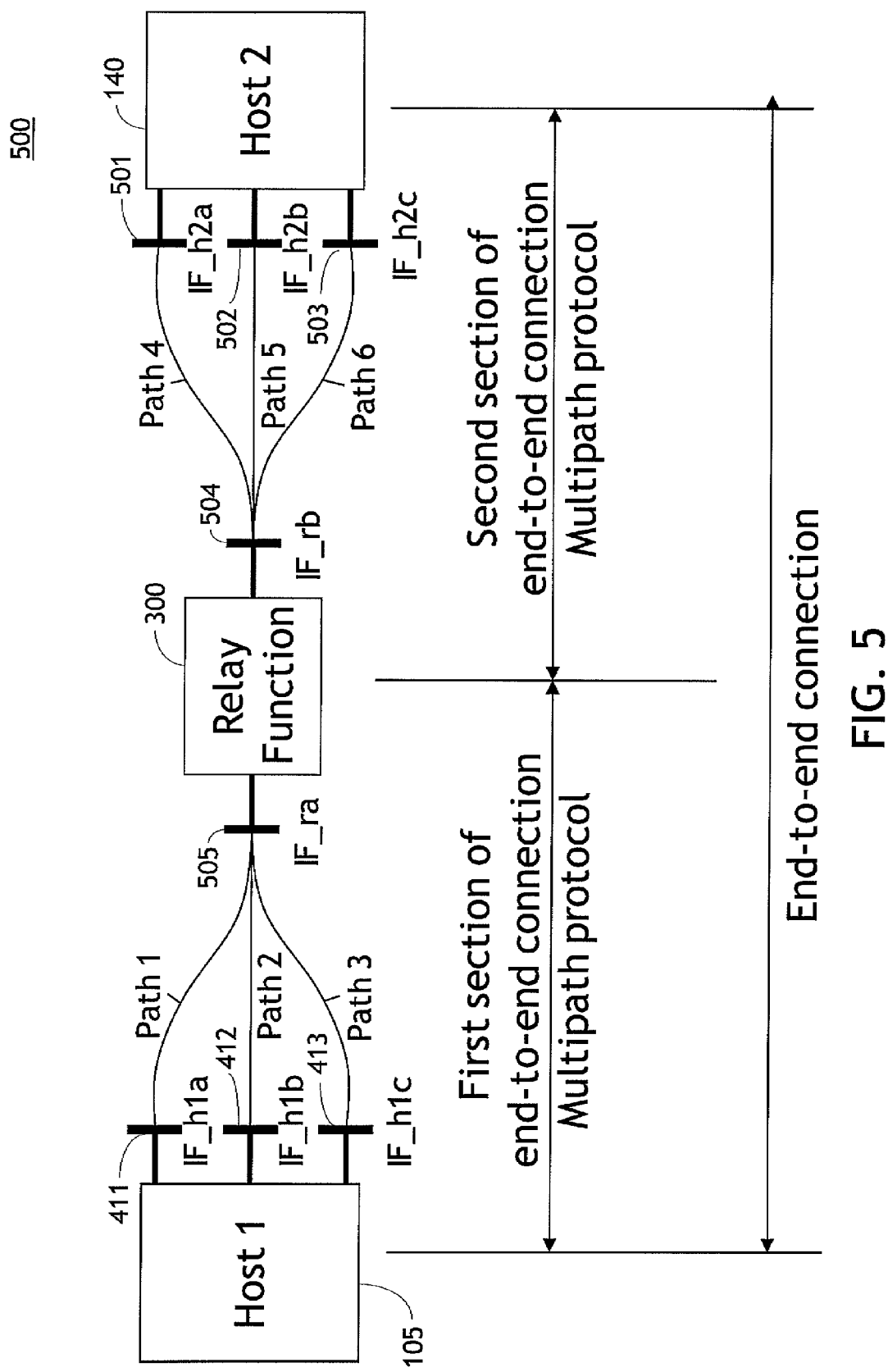
FIG. 5 depicts a graphical representation of end-to-end split connection with relay function supporting two multipath sections according to an embodiment.

FIG. 5 depicts a graphical representation of end-to-end split connection with relay function supporting two multipath sections according to an embodiment. In one embodiment, relay function 300 supports split connections, where each section 504, 505 supports a multipath protocol.

Interfaces 411-413 support three distinct paths converging at interface 505 to thereby constitute one section associated with the source host. Interfaces 501-503 converge at interface 504 to thereby constitute the other section (associated with the one or more destination hosts).

In this embodiment, both multipath sections advantageously use the same end-to-end Data SEQ numbers space. Segments arriving on a subflow of one section of the split connection are mapped to Data SEQ numbers and then transmitted on a subflow pertaining to the other section of the split connection. Each interface supports a specific protocol, e.g., 3G/4G, WLAN, WiFi and the like. In other embodiments, other protocols are supported.

Figure 6:
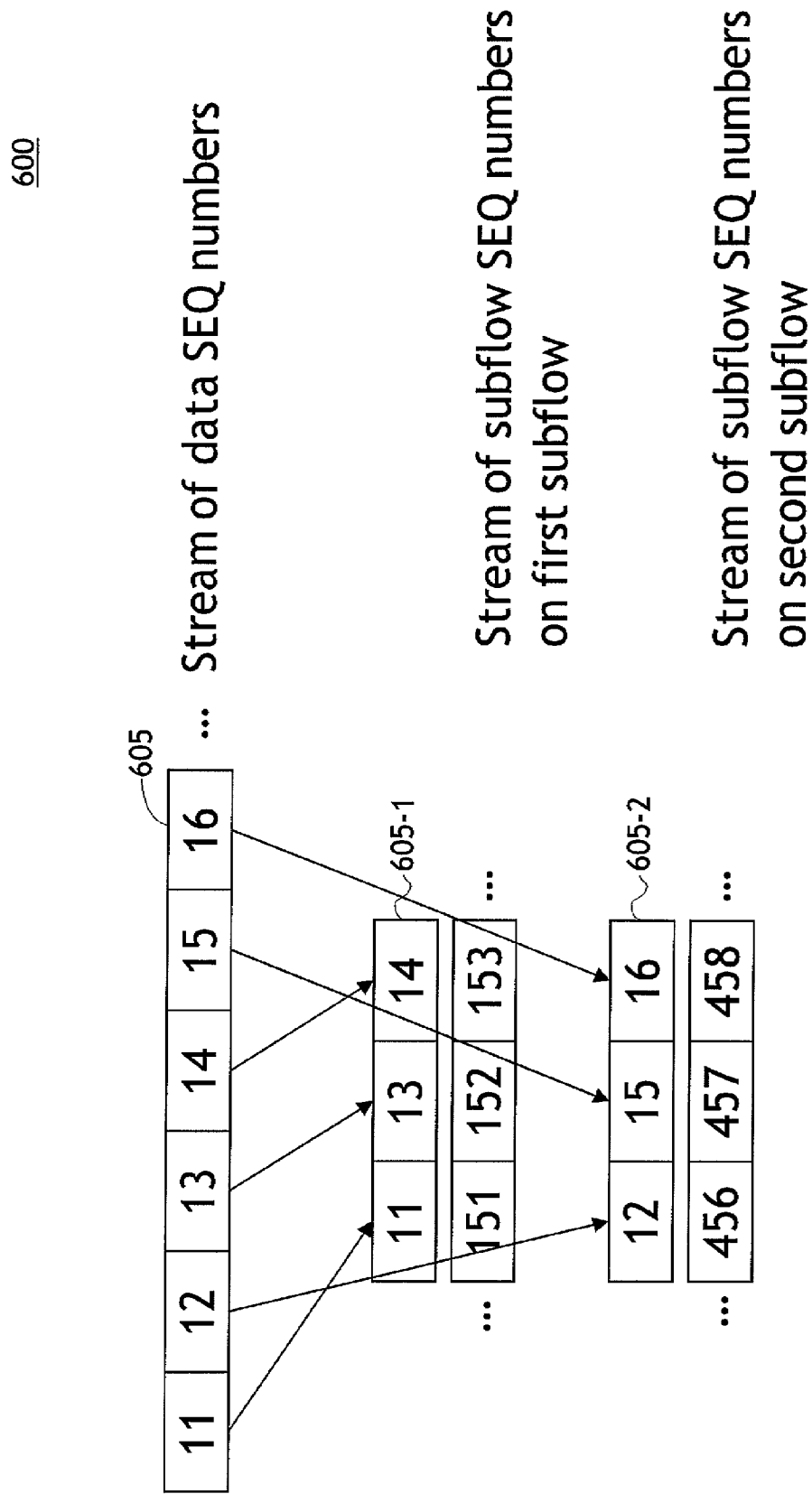
FIG. 6 depicts a graphical representation of mapping data SEQ numbers to subflow SEQ numbers for two subflows according to an embodiment.

FIG. 6 depicts a graphical representation of mapping data SEQ numbers to subflow SEQ numbers for two subflows according to an embodiment. Mapping between Subflow SEQ/ACK numbers and Data SEQ/ACK numbers 605 are provided explicitly for each packet in one embodiment. In another embodiment, mapping between Subflow SEQ/ACK numbers and Data SEQ/ACK numbers are provided for a bulk of packets or implicitly. An implicit mapping could be based on the sequence numbers on a packet and an initial mapping provided earlier for an unknown time frame or until further notification.

Implementation of the sequence space is limited by the number of digits allocated for the SEQ- and ACK number parameters. To overcome this limitation, stream-based protocols roll over to zero as soon as these parameters reach the max value. The above algebraic comparisons of sequence numbers (i.e. larger and smaller) can still be applied as long as this rollover is taken into account. TCP also provides time stamps to support roll-over detection.

Figure 7:
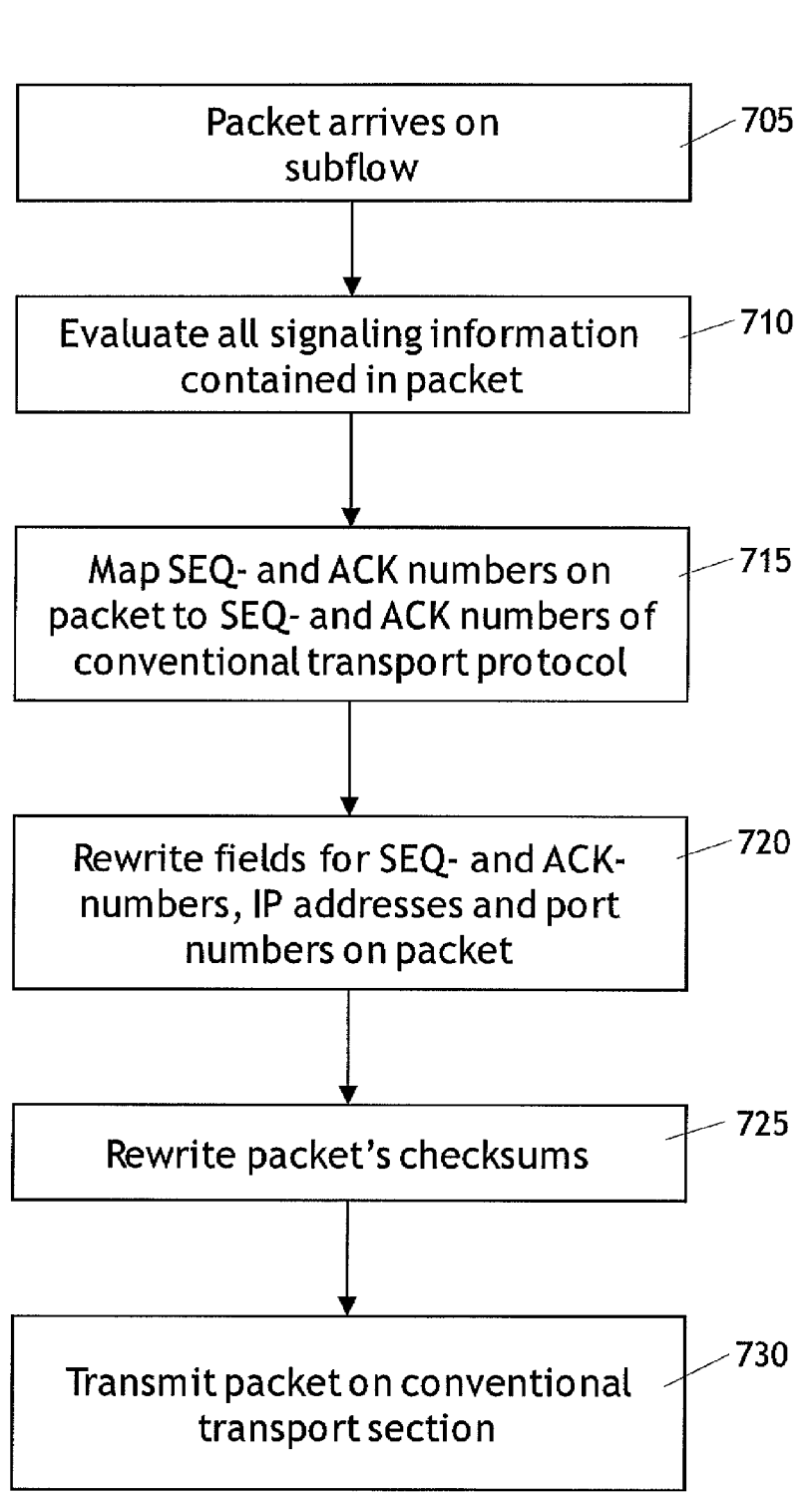
FIG. 7 depicts a flow diagram of a method for MPTCP compliant processing of an incoming packet according to an embodiment.

FIG. 7 depicts a flow diagram of a method for MPTCP compliant processing of an incoming packet according to an embodiment. At step 705, a packet arrives at the relay on one of the multipath subflows. All multipath signaling necessary to interface with the multipath-capable host are supported as described herein. One embodiment provides for signaling exchange on subflow management such as set up and tear down of subflows. Another embodiment provides for signaling exchange on multipath connection management such as to set up and tear down the multipath section of the connection. Various embodiments provide for signaling exchange on subflow preferences and mapping between subflow and data sequence space if supported by the multipath protocol.

At step 710, relay function 300 evaluates all signaling information contained on the packet that refer to multipath- or subflow operation. At step 715, relay function 300 maps the packets subflow SEQ Number and subflow ACK Number to appropriate SEQ Number and ACK Number of the conventional transport section of the connection. At step 720, relay function 300 rewrites fields for SEQ-number-, ACK-number, IP addresses- and port numbers on the packet to the corresponding values used on the conventional transport section. At step 725, relay function 300 rewrites the packet's checksum and at step 730 the packet is propagated toward the one or more destination hosts.

Figure 8:
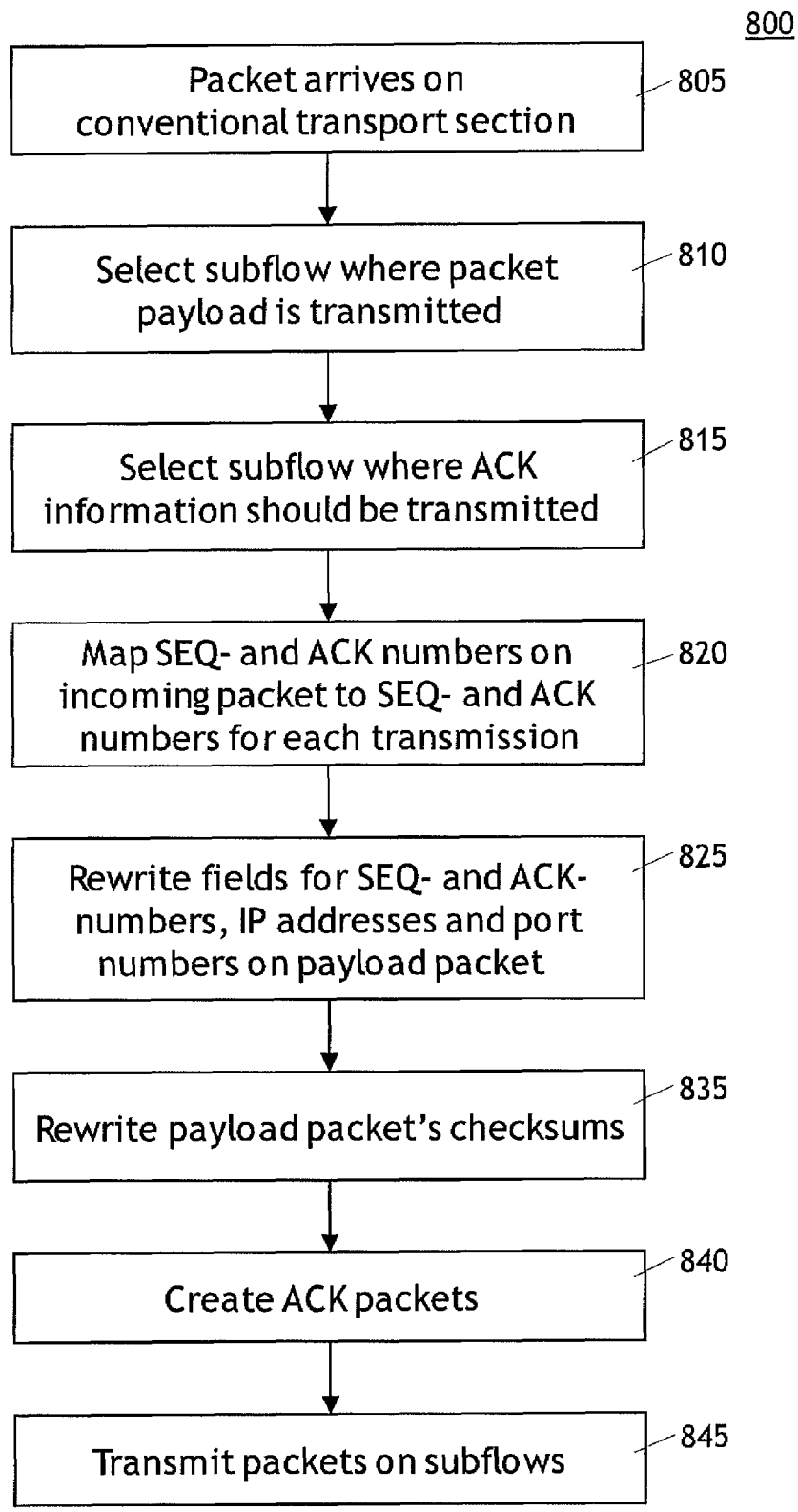
FIG. 8 depicts a flow diagram of a method for Conventional TCP compliant processing of an incoming packet according an embodiment.

FIG. 8 depicts a flow diagram of a method for Conventional TCP compliant processing of an incoming packet according an embodiment. At step 805, a packet is received at relay function 300 from host 135, which utilizes the conventional transport section. Although described from the perspective of one host, it will be appreciated by those skilled in the art that packets may be received by any number of hosts.

At step 810, the payload and the acknowledgement information of the incoming packet are dissected. This is necessary because the ACKs may refer to payload delivered in reverse direction on subflows other than where the present payload should be transmitted.

At step 815, one subflow is selected where the packet payload should be transmitted.

At step 820, SEQ- and ACK numbers on incoming packet are mapped to SEQ- and ACK numbers for each transmission.

At step 825, relay function 300 rewrites fields for SEQ- and ACK-numbers, IP addresses and port numbers on payload packet to the corresponding values used for the payload and inserts signaling information for subflow. In another embodiment, the same operation is performed for multipath operation.

At step 830, relay function 300 selects one or multiple subflows where the acknowledgement information should be transmitted. The ACK number carried on the packet is mapped to the appropriate subflow ACK number. In one embodiment, signaling information is inserted for subflow. In another embodiment, signaling information is inserted for multipath operation. At step 835, the payload packet's checksums are rewritten and the packets are transmitted.

At step 840, the corresponding ACK packets are created and transmitted. At step 845, packets on subflows are transmitted.

Generally speaking, the above embodiments contemplate methods, systems, apparatus and the like that provides a relay function operable to relay packets between two transport protocols, wherein one or both of the transport protocols supports multiple subflows, wherein each subflow has its own contiguous sequence number space for each flow direction. The relay functions support signaling to setup or teardown flows or subflows for transport protocol(s). When a packet with a payload (e.g., data) arrives at the relay, the relay determines the flow or subflow towards which the payload should be transmitted, and maps the SEQ number of the packet to an appropriate SEQ number for that flow or subflow. Similarly, when a packet with acknowledgment information (e.g., ACK, NACK, etc.) arrives at the relay, the relay determines the flow or subflow towards which the acknowledgment information should be transmitted, and maps ACK number of the packet to an ACK number of that flow or subflow. In this manner, since payload packets and ACK packets are updated and transmitted individually in a packet by packet manner, there is no need for stream assembly functions.

Figure 9:
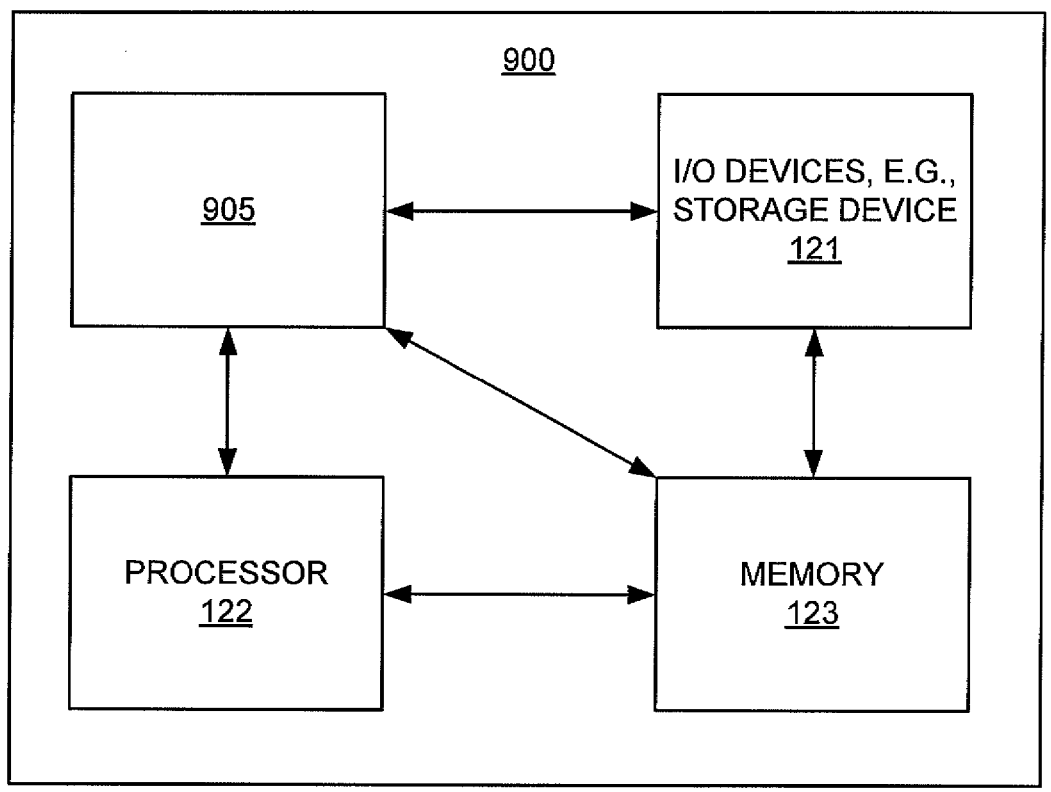
FIG. 9 depicts a high-level block diagram of a computing device suitable for use in implementing various functions described herein.

FIG. 9 depicts a high-level block diagram of a computer suitable for use in performing functions described herein.

As depicted in FIG. 9, computer 900 includes a processor element 122 (e.g., a central processing unit (CPU) and/or other suitable processor(s)), a memory 123 (e.g., random access memory (RAM), read only memory (ROM), and the like), a cooperating module/process 905, and various input/output devices 121 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software and/or hardware, e.g., using a general purpose computer, one or more application specific integrated circuits (ASIC), and/or any other hardware equivalents. In one embodiment, the cooperating process 905 can be loaded into memory 123 and executed by processor 122 to implement the functions as discussed herein. Thus, cooperating process 905 (including associated data structures) can be stored on a computer readable storage medium, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method of packet-by-packet relay between first and second sections of an end-to-end connection, each section using a respective transport protocol wherein at least one of the transport protocols supports multiple subflows, the method comprising:

for each packet including a payload received from one section of the multiple section connection, mapping packet sequence information to a corresponding payload destination flow or subflow of the other section of the multiple section connection, and forwarding a packet including the packet payload and mapped sequence information toward a port associated with the payload destination flow or subflow; and for each received packet including acknowledgment information received from one section of a multiple section connection, mapping the acknowledgment information to an acknowledgment destination flow or subflow of the other section of the multiple section connection, and forwarding a packet including the mapped acknowledgment information toward a port associated with the acknowledgment destination flow or subflow.

2. The method of claim 1, wherein a first transport protocol comprises Multipath Transmission Control Protocol (MPTCP), Multi-connection Transmission Control Protocol (MCTCP), Concurrent Multipath Transfer (CMT) Stream Control Transmission Protocol (CMT SCTP), Stream Control Transmission Protocol (SCTP), Transmission Control Protocol (TCP), Long Term Evolution (LTE).

3. The method of claim 1, wherein a second transport protocol comprises Multipath Transmission Control Protocol (MPTCP), Multi-connection Transmission Control Protocol (MCTCP), Concurrent Multipath Transfer (CMT) Stream Control Transmission Protocol (CMT SCTP), Stream Control Transmission Protocol (SCTP), Transmission Control Protocol (TCP), Long Term Evolution (LTE).

4. The method of claim 1, wherein at least some of the received packets are associated with a multi-homed source host communicating via a plurality of interfaces.

5. The method of claim 4, wherein the plurality of interfaces comprise at least two of the following interfaces: 3G, 4G, WiFi, WLAN and LTE.

6. The method of claim 4, wherein multipath signaling information associated with the plurality of interfaces is included within at least one of a received packet header portion, a received packet payload portion and an out of band signaling connection.

7. The method of claim 1, wherein at least some of the received packets are associated with a single-homed source host communicating via a single interface.

8. The method of claim 1, wherein said mapping includes selecting one of a plurality of payload destination subflows.

9. The method of claim 1, wherein said mapping includes selecting one or more of a plurality of payload destination subflows, or a single acknowledgment destination subflow.

10. The method of claim 1, wherein at least some of the payload destination subflows are associated with a multi-homed source host communicating via a plurality of interfaces.

11. The method of claim 1, wherein acknowledgment information included within a received packet is associated with payload information included within a previously processed packet, said acknowledgment destination flow or subflow comprising the flow or subflow from which the previously processed packet was received.

12. The method of claim 1, further comprising:
for each received packet including a payload, storing packet sequence information associated with a corresponding packet source flow or subflow;
said mapping of acknowledgment information being performed using stored packet sequence information.

13. The method of claim 12, wherein said packet sequence information is stored in a table.

14. The method of claim 1, further comprising in response to the establishment of a new subflow of a source transport protocol supporting multiple subflows, selecting for mapping a corresponding destination flow or subflow.

15. The method of claim 14, further comprising in response to the establishment of a new subflow of a source transport protocol supporting multiple subflows, establishing a corresponding new destination subflow.

16. The method of claim 1, further comprising in response to the tearing down of a subflow of a source transport protocol supporting multiple subflows, tearing down a corresponding new destination subflow.

17. A non-transitory computer readable medium including software instructions which, when executed by a processer, perform a method of packet-by-packet relay between first and second sections of an end-to-end connection, each section using a respective transport protocol, wherein at least one of the transport protocols supports multiple subflows, the method comprising:

for each packet including a payload received from one section of the multiple section connection, mapping packet sequence information to a corresponding payload destination flow or subflow of the other section of the multiple section connection, and forwarding a packet including the packet payload and mapped sequence information toward a port associated with the payload destination flow or subflow; and for each received packet including acknowledgment information received from one section of a multiple section connection, mapping the acknowledgment information to an acknowledgment destination flow or subflow of the other section of the multiple section connection, and forwarding a packet including the mapped acknowledgment information toward a port associated with the acknowledgment destination flow or subflow.

18. The computer readable medium of claim 17, wherein at least some of the received packets are associated with a multi-homed source host communicating via a plurality of interfaces.

19. The computer readable medium of claim 17, wherein acknowledgment information included within a received packet is associated with payload information included within a previously processed packet, said acknowledgment destination flow or subflow comprising the flow or subflow from which the previously processed packet was received.

20. The computer readable medium of claim 17, the method further comprising:

for each received packet including a payload, storing packet sequence information associated with a corresponding packet source flow or subflow; said mapping of acknowledgment information being performed using stored packet sequence information.

21. An apparatus for packet-by-packet relay between first and second sections of end-to-end stream-based transport connections, each section using a respective transport protocol wherein at least one of the transport protocols supports multiple subflows, the apparatus comprising a processor configured for:

for each packet including a payload received from one section of the multiple section connection, mapping packet sequence information to a corresponding payload destination flow or subflow of the other section of the multiple section connection, and forwarding a packet including the packet payload and mapped sequence information toward a port associated with the payload destination flow or subflow; and for each received packet including acknowledgment information received from one section of a multiple section connection, mapping the acknowledgment information to an acknowledgment destination flow or subflow of the other section of the multiple section connection, and forwarding a packet including the mapped acknowledgment information toward a port associated with the acknowledgment destination flow or subflow.

22. The apparatus of claim 21, wherein said apparatus comprises a router providing packet-by-packet relay between a first multi-homed host and at least one of a single-homed host and a second multi-homed host.

23. The apparatus of claim 22, wherein said first multi-homed host comprises a mobile device operative to communicate via each of a mobile access network and a Wi-Fi network.

24. The apparatus of claim 23, wherein said mobile access network comprises one of a 3G, 4G and LTE network, and said Wi-Fi network comprises one of a WiFi and WLAN access network.

* * * * *